United States Patent
Lummerstorfer et al.

(10) Patent No.: US 11,485,843 B2
(45) Date of Patent: Nov. 1, 2022

(54) REINFORCED POLYPROYLENE COMPOSITION

(71) Applicant: BOREALIS AG, Vienna (AT)

(72) Inventors: Thomas Lummerstorfer, Linz (AT); Michael Tranninger, Kematen an der Krems (AT)

(73) Assignee: BOREALIS AG, Vienna (AT)

(*) Notice: Subject to any disclaimer, the term of this patent is extended or adjusted under 35 U.S.C. 154(b) by 270 days.

(21) Appl. No.: 16/646,976

(22) PCT Filed: Sep. 28, 2018

(86) PCT No.: PCT/EP2018/076376
§ 371 (c)(1),
(2) Date: Mar. 12, 2020

(87) PCT Pub. No.: WO2019/063746
PCT Pub. Date: Apr. 4, 2019

(65) Prior Publication Data
US 2020/0263012 A1    Aug. 20, 2020

(30) Foreign Application Priority Data
Sep. 29, 2017 (EP) .................................... 17194166

(51) Int. Cl.
*C08L 23/12* (2006.01)
*C08L 23/16* (2006.01)
*C08L 51/06* (2006.01)
*C08K 3/04* (2006.01)
*C08K 7/06* (2006.01)

(52) U.S. Cl.
CPC ................ *C08L 23/12* (2013.01); *C08K 3/04* (2013.01); *C08K 7/06* (2013.01); *C08L 23/16* (2013.01); *C08L 51/06* (2013.01); *C08L 2205/02* (2013.01); *C08L 2205/03* (2013.01); *C08L 2207/02* (2013.01)

(58) Field of Classification Search
CPC ..... C08L 2205/035; C08L 23/12; C08L 51/06
See application file for complete search history.

(56) References Cited

U.S. PATENT DOCUMENTS

| | | | |
|---|---|---|---|
| 10,717,832 B2* | 7/2020 | Boragno | C08K 7/06 |
| 2012/0190784 A1 | 7/2012 | Posch et al. | |
| 2015/0368449 A1 | 12/2015 | Kastner et al. | |
| 2016/0208084 A1 | 7/2016 | Hrachova et al. | |

FOREIGN PATENT DOCUMENTS

| | | |
|---|---|---|
| CN | 106604961 A | 4/2017 |
| EP | 0491566 A3 | 9/1992 |
| EP | 0586390 B1 | 5/1997 |
| EP | 0591224 B1 | 2/1998 |
| EP | 0887379 B1 | 12/2004 |
| EP | 3095818 A1 | 11/2016 |
| EP | 3095819 A1 | 11/2016 |
| EP | 3202842 A1 | 8/2017 |
| JP | 2010/248482 A1 | 11/2010 |
| JP | 2013166921 A | 8/2013 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2016/033188 A1 | 3/2016 |

OTHER PUBLICATIONS

European Office Action for Application No. 17 194 166.9-1102 dated Aug. 25, 2020.
Japanese Office Action for Application No. 2020-511362; dated Mar. 16, 2021; 6 pgs.
Applicant: Borealis AG; "Reinforced Polypropylene Composition"; Chinese Office Action for Application No. 201880059155.9; dated Dec. 30, 2021; 22 pgs.
Lucie Marcanikova, et al.; "Rheological Behavior of Composites Based on Carbon Fibers Recycled from Aircraft Waste"; CP1152, Novel Trends in Rheology III—Proceedings of the International Conference, American Institute of Physics, 2009; 15 pgs.
Busico, et al., "Microstructure of polypropylene",Progress in Polymer Science, 26 (2001) pp. 443-533.
Busico et al., "Alk-1-ene Polymerization in the Presence of a Monocyclopentadienyl Zirconium(IV) Acetamidinate Catalyst: Microstructural and Mechanistic Insightsa", Macromol Rapid Communication, 2007, 28, pp. 1128-1134.
Busico, et al., "Full Assignment of the 13C NMR Spectra of Regioregular Polypropylenes: Methyl and Methylene Region", Macromolecules 1997, 30, pp. 6251-6263.
H.N. Cheng, "I3C NMR Analysis of Ethylene-Propylene Rubbers", Macromolecules 1984, 17, pp. 1950-1955.
Extended European Search Report for Application No. 17194166. 9-1102, dated Feb. 16, 2018.
Zweifel, et al., "Plastics Additives Handbook", 6th Edition, Department of Materials, Institute of Polymers, 2009, pp. 1141-1190.
Zweifel, et al., "Plastics Additives Handbook", 5th Edition, Department of Materials, Institute of Polymers, 2001.
Resconi, et. al., "Selectivity in Propene Polymerization with Metallocene Catalysts", Chem. Rev. 2000, 100, 1253-1345.
Frank, et al., "GS-VIII : OP18 New Measurement Method for Appearance of Flow Marks or Tiger Stripes Defect for Improved Quantification and Analysis", pp. 25, Mar. 15, 2009.

(Continued)

*Primary Examiner* — Jeffrey C Mullis
(74) *Attorney, Agent, or Firm* — Tarolli, Sundheim, Covell & Tummino LLP

(57) ABSTRACT

Reinforced polypropylene composition comprising a heterophasic polypropylene copolymer, a polar modified polypropylene and carbon fibers.

15 Claims, No Drawings

(56) References Cited

OTHER PUBLICATIONS

Wang et al., "Structural Analysis of Ethylene/Propylene Copolymers Synthesized with a Constrained Geometry Catalyst", Macromolecules 2000, 33, pp. 1157-1162.

Zhou et al., "A new decoupling method for accurate quantification of polyethylene copolymer composition and triad sequence distribution with 13C NMR", Journal of Magnetic Resonance 187 (2007) pp. 225-233.

* cited by examiner

REINFORCED POLYPROYLENE COMPOSITION

The present invention is directed at a reinforced polypropylene composition comprising a heterophasic polypropylene copolymer, a polar modified polypropylene and carbon fibers. Furthermore, the present invention is directed at an article comprising the reinforced polypropylene composition.

Reinforced polymer compositions are widely used. However in addition to the requirements of stiffness and impact resistance, light weight has become an important requirement for many applications in the car. In general there are two possibilities to support these requirements, namely one decreases the density of the material or one increases the material stiffness. As regards the stiffness increase, it can be generally obtained by adding fibers as reinforcing material into the polymer. For example, glass fibers are widely used as reinforcing material because of their good processability, excellent properties and low price. Also, carbon fibers are well known as reinforcing material because of their low density in combination with high stiffness. Nevertheless, the addition of fibers as reinforcing material typically results in an overall increase of density such that a sufficient light weight material having well-balanced mechanical properties such as high stiffness and impact is only difficult to obtain.

Accordingly, the automobile industries seek for a composite material fulfilling the demanding requirements of well-balanced mechanical properties such as high stiffness and impact at light weight.

The finding of the present invention is to use a specific heterophasic propylene copolymer, in combination with a polar modified polypropylene and carbon fibers in order to improve the mechanical properties of the polypropylene composition.

In a first aspect the present invention is directed at a polypropylene composition (C) comprising
(a) 55 to 95 parts per weight of a heterophasic propylene copolymer (HECO);
(b) 1.0 to 10 parts per weight of a polar modified polypropylene (PMP);
(c) 2.5 to 30 parts per weight of carbon fibers (CF);
based on the total parts by weight of compounds (a), (b) and (c).

In a preferred embodiment of the polypropylene composition (C), the heterophasic propylene copolymer (HECO) comprises
(a) a polypropylene matrix (M) and
(b) an elastomeric copolymer (E) comprising units derived from propylene and ethylene and/or $C_4$ to $C_{20}$ alpha-olefins.

In another preferred embodiment of the polypropylene composition (C), the intrinsic viscosity (IV) of the xylene soluble (XCS) fraction of the heterophasic propylene copolymer (HECO) is in the range of 3.0 to 4.0 dl/g.

The polypropylene composition (C) may comprise the heterophasic propylene copolymer (HECO) in an amount of at least 55 wt.-%, based on the total weight of the polypropylene composition (C).

The heterophasic propylene copolymer (HECO) may have
(a) a melt flow rate $MFR_2$ (230° C., 2.16 kg) measured according to ISO 1133 of not more than 60 g/10 min;
and/or
(b) a comonomer content of not more than 35 mol %;
and/or
(c) a xylene cold solubles (XCS) fraction of not more than 55 wt.-%, based on the weight of the heterophasic propylene copolymer (HECO);
and/or
(d) an intrinsic viscosity (IV) of the xylene soluble (XCS) fraction of the heterophasic propylene copolymer (HECO) of not more than 3.5 dl/g;
and/or
(e) a comonomer content of the xylene soluble (XCS) fraction of the heterophasic propylene copolymer (HECO) of not more than 65 mol %.

The polypropylene composition (C) may comprise the polar modified polypropylene (PMP) in an amount of at least 1.0 wt.-%, preferably at least 2.5 wt.-%, based on the total weight of the polypropylene composition (C).

The polar modified polypropylene (PMP) may comprise groups derived from polar groups selected from the group consisting of acid anhydrides, carboxylic acids, carboxylic acid derivatives, primary and secondary amines, hydroxyl compounds, oxazoline epoxides, and ionic compounds.

The polar modified polypropylene (PMP) may be a propylene polymer grafted with maleic anhydride.

The polypropylene composition (C) may comprise the carbon fibers (CF) in an amount of at least 2.5 wt.-%, based on the total weight of the polypropylene composition (C).

The heterophasic propylene copolymer (HECO) and the polar modified polypropylene (PMP) may be comprised in an amount of at least 57.5 wt.-%, preferably in an amount of at least 76 wt.-%, more preferably in an amount of at least 82 wt.-%, even more preferably in an amount of at least 89 wt.-%, based on the total weight of the polypropylene composition (C).

The heterophasic propylene copolymer (HECO), the polar modified polypropylene (PMP) and the carbon fibers (CF) may be comprised in an amount of at least 60 wt.-%, preferably in an amount of at least 81 wt.-%, more preferably in an amount of at least 89 wt.-%, even more preferably in an amount of at least 98 wt.-%, based on the total weight of the polypropylene composition (C).

The polypropylene composition (C) may have
(a) a melt flow rate $MFR_2$ (230° C., 2.16 kg) measured according to ISO 1133 of not more than 25 g/10 min;
and/or
(b) a tensile modulus measured according to ISO 527-2 of at least 2500 MPa;
and/or
(c) a tensile strength measured according to ISO 527-2 of at least 25 MPa
and/or
(d) a Charpy Impact Strength measured according to ISO 179-1eU:2000 at 23° C. of at least 35 kJ/m$^2$
and/or
(e) a tensile elongation at break measured according to ISO 527-2 of at least 6.0%.

Preferably the polypropylene composition (C) does not comprise
(a) any other fibers besides the carbon fibers (CF);
and/or
(b) any other polymers besides the heterophasic propylene copolymer (HECO) and the polar modified polypropylene (PMP).

In a second aspect the present invention is directed at an article comprising the polymer composition (C) according to the first aspect.

The article may be a molded article or an extruded article, preferably a molded article, like an injection molded article or a compression molded article The article may be an automotive article, preferably an automotive exterior or interior article, like instrumental carriers, shrouds, structural carriers, bumpers, side trims, step assists, body panels, spoilers, dashboards, and interior trims.

In the following the polypropylene composition (C) and the article comprising the polypropylene composition (C) are described in more detail:

The Polypropylene Composition (C)

The present invention is directed at a polypropylene composition (C) comprising a heterophasic propylene copolymer (HECO), a polar modified polypropylene (PMP) and carbon fibers (CF).

The polypropylene composition (C) may comprise (a) the heterophasic propylene copolymer (HECO) in an amount in the range of 55 to 95 parts per weight, preferably in the range of 73 to 92 parts per weight, more preferably in the range of 79 to 90 parts by weight;

and/or (b) the polar modified polypropylene (PMP) in an amount in the range of 1.0 to 10 parts per weight, preferably in the range of 2.5 to 10 parts per weight, more preferably in the range of 3.0 to 7.0 parts per weight, even more preferably in the range of 3.0 to 6.0 parts per weight;

and/or (c) the carbon fibers (CF) in an amount in the range of 2.5 to 35 parts per weight, preferably in the range of 5.0 to 20 parts per weight, more preferably in the range of 7.0 to 15 parts per weight;

based on the total parts by weight of the heterophasic propylene copolymer (HECO), the polar modified polypropylene (PMP) and the carbon fibers (CF)

In one embodiment the polypropylene composition comprises the heterophasic propylene copolymer (HECO) in an amount in the range of 55 to 95 parts per weight, the polar modified polypropylene (PMP) in an amount in the range of 1.0 to 10 parts per weight and the carbon fibers (CF) in an amount in the range of 2.5 to 35 parts per weight, based on the total parts by weight of the heterophasic propylene copolymer (HECO), the polar modified polypropylene (PMP) and the carbon fibers (CF).

In one embodiment the polypropylene composition comprises the heterophasic propylene copolymer (HECO) in an amount in the range of 55 to 95 parts per weight, the polar modified polypropylene (PMP) in an amount in the range of 2.5 to 10 parts per weight and the carbon fibers (CF) in an amount in the range of 2.5 to 35 parts per weight, based on the total parts by weight of the heterophasic propylene copolymer (HECO), the polar modified polypropylene (PMP) and the carbon fibers (CF)

In one embodiment the polypropylene composition comprises the heterophasic propylene copolymer (HECO) in an amount in the range of 73 to 92 parts per weight, the polar modified polypropylene (PMP) in an amount in the range of 3.0 to 7.0 parts per weight and the carbon fibers (CF) in an amount in the range of 2.5 to 35 parts per weight, based on the total parts by weight of the heterophasic propylene copolymer (HECO), the polar modified polypropylene (PMP) and the carbon fibers (CF).

In one embodiment the polypropylene composition comprises the heterophasic propylene copolymer (HECO) in an amount in the range of 79 to 90 parts per weight, the polar modified polypropylene (PMP) in an amount in the range of 3.0 to 6.0 parts per weight and the carbon fibers (CF) in an amount in the range of 5.0 to 20 parts per weight, based on the total parts by weight of the heterophasic propylene copolymer (HECO), the polar modified polypropylene (PMP) and the carbon fibers (CF).

In one embodiment the polypropylene composition comprises the heterophasic propylene copolymer (HECO) in an amount in the range of 79 to 90 parts per weight, the polar modified polypropylene (PMP) in an amount in the range of 3.0 to 6.0 parts per weight and the carbon fibers (CF) in an amount in the range of 7.0 to 15 parts per weight based on the total parts by weight of the heterophasic propylene copolymer (HECO), the polar modified polypropylene (PMP) and the carbon fibers (CF).

In one embodiment the polypropylene composition comprises the heterophasic propylene copolymer (HECO) in an amount in the range of 55 to 95 wt.-%, the polar modified polypropylene (PMP) in an amount in the range of 1.0 to 10 wt.-% and the carbon fibers (CF) in an amount in the range of 2.5 to 35 wt.-%, based on the total weight of the polypropylene composition (C).

In one embodiment the polypropylene composition comprises the heterophasic propylene copolymer (HECO) in an amount in the range of 55 to 95 wt.-%, the polar modified polypropylene (PMP) in an amount in the range of 2.5 to 10 wt.-% and the carbon fibers (CF) in an amount in the range of 2.5 to 35 wt.-%, based on the total weight of the polypropylene composition (C).

In one embodiment the polypropylene composition comprises the heterophasic propylene copolymer (HECO) in an amount in the range of 73 to 92 wt.-%, the polar modified polypropylene (PMP) in an amount in the range of 3.0 to 7.0 wt.-% and the carbon fibers (CF) in an amount in the range of 2.5 to 35 wt.-%, based on the total weight of the polypropylene composition (C).

In one embodiment the polypropylene composition comprises the heterophasic propylene copolymer (HECO) in an amount in the range of 79 to 90 wt.-%, the polar modified polypropylene (PMP) in an amount in the range of 3.0 to 6.0 wt.-% and the carbon fibers (CF) in an amount in the range of 5.0 to 20 wt.-%, based on the total weight of the polypropylene composition (C).

In one embodiment the polypropylene composition comprises the heterophasic propylene copolymer (HECO) in an amount in the range of 79 to 90 wt.-%, the polar modified polypropylene (PMP) in an amount in the range of 3.0 to 6.0 wt.-% and the carbon fibers (CF) in an amount in the range of 7.0 to 15 wt.-%, based on the total weight of the polypropylene composition (C).

It is appreciated that Polypropylene composition (C) comprises the heterophasic propylene copolymer (HECO) and the polar modified polypropylene (PMP) in an amount of at least 57.5 wt.-%, preferably in an amount of at least 76 wt.-%, more preferably in an amount of at least 82 wt.-%, even more preferably in an amount of at least 88 wt.-%, based on the total weight of the polypropylene composition (C).

Furthermore, it is appreciated that Polypropylene composition (C) comprises the heterophasic propylene copolymer (HECO) and the polar modified polypropylene (PMP) and the carbon fibers (CF) are comprised in an amount of at least 60 wt.-%, preferably in an amount of at least 81 wt.-%, more preferably in an amount of at least 89 wt.-%, even more preferably in an amount of at least 98 wt.-%, based on the total weight of the polypropylene composition (C).

The polypropylene composition (C) may have a melt flow rate $MFR_2$ (230° C., 2.16 kg) measured according to ISO 1133 of not more than 25 g/10 min, preferably of not more than 15 g/10 min, like in the range of 1.0 to 25 g/10 min, preferably in the range of 5.0 to 15 g/10 min, more preferably in the range of 7.0 to 12 g/10 min.

The polypropylene composition (C) may have a tensile modulus measured according to ISO 527-2 of at least 2500 MPa, preferably of at least 3000 MPa, like in the range of 2500 to 6500 MPa, preferably in the range of 3000 to 6000 MPa.

The polypropylene composition (C) may have a tensile strength measured according to ISO 527-2 of at least 25 MPa, preferably of at least 30 MPa, like in the range of 25 to 80 MPa, preferably in the range of 30 to 70 MPa.

The polypropylene composition (C) may have a Charpy Impact Strength measured according to ISO 179-1eU:2000 at 23° C. of at least 35 kJ/m$^2$, preferably of at least 40 kJ/m$^2$, like in the range of 35 to 80 kJ/m$^2$, preferably in the range of 40 to 60 kJ/m$^2$.

The polypropylene composition (C) may have a tensile elongation at break measured according to ISO 527-2 of at least 6.0%, preferably of at least 7.0%, like in the range of 6.0 to 20%, preferably in the range of 7.0 to 10%.

In one embodiment the polypropylene composition (C) has a melt flow rate MFR2 (230° C., 2.16 kg) measured according to ISO 1133 in the range of 1.0 to 25 g/10 min, a tensile modulus measured according to ISO 527-2 in the range of 2500 to 6500 MPa, a Charpy Impact Strength measured according to ISO 179-1eU:2000 at 23° C. in the range of 35 to 80 kJ/m$^2$ and a tensile elongation at break measured according to ISO 527-2 in the range of 6.0 to 20%

In one embodiment the polypropylene composition (C) has a melt flow rate MFR2 (230° C., 2.16 kg) measured according to ISO 1133 in the range of 1.0 to 25 g/10 min, a tensile modulus measured according to ISO 527-2 in the range of 2500 to 6500 MPa, a Charpy Impact Strength measured according to ISO 179-1eU:2000 at 23° C. in the range of 40 to 60 kJ/m$^2$ and a tensile elongation at break measured according to ISO 527-2 in the range of 7.0 to 10%

In one embodiment the polypropylene composition (C) has a melt flow rate MFR2 (230° C., 2.16 kg) measured according to ISO 1133 in the range of 1.0 to 25 g/10 min, a tensile modulus measured according to ISO 527-2 in the range of 3000 to 6000 MPa, a Charpy Impact Strength measured according to ISO 179-1eU:2000 at 23° C. in the range of 40 to 60 kJ/m$^2$ and a tensile elongation at break measured according to ISO 527-2 in the range of 7.0 to 10%.

Preferably the heterophasic propylene copolymer (HECO) is the only heterophasic propylene copolymer present in the polypropylene composition (C). In one embodiment the heterophasic propylene copolymer (HECO) is the only heterophasic propylene copolymer present in the polypropylene composition (C).

Preferably the polar modified polypropylene (PMP) is the only polar modified polypropylene present in the polypropylene composition (C). In one embodiment the polar modified polypropylene (PMP) is the only polar modified polypropylene present in the polypropylene composition (C).

In a preferred embodiment the polypropylene composition (C) does not comprise other polymers besides the heterophasic propylene copolymer (HECO) and the polar modified polypropylene (PMP) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the polypropylene composition (C). If an additional polymer is present, such a polymer is typically a polymeric carrier material (PCM) for additives.

Preferably the heterophasic propylene copolymer (HECO) and the polar modified polypropylene (PMP) are the only polymers present in the polypropylene composition (C). In one embodiment the heterophasic propylene copolymer (HECO) and the polar modified polypropylene (PMP) are the only polymers present in the polypropylene composition (C).

Preferably the carbon fibers (CF) are the only fibers present in the polypropylene composition (C). In one embodiment the polypropylene composition (C) does not comprise fibers selected from the group consisting of glass fibers, metal fibers, mineral fibers, ceramic fibers and mixtures thereof In one embodiment the polypropylene composition (C) does not comprise fibers obtained from an inorganic material.

Thus, in a preferred embodiment the polypropylene composition (C) consists of the heterophasic propylene copolymer (HECO), the polar modified polypropylene (PMP) and the carbon fibers (CF). However, it is appreciated that this does not exclude situations wherein additives (AD) are present, as will be explained in detail below.

The polypropylene composition (C) can be obtained by melt blending. This process may include steps of adding
(a) heterophasic propylene copolymer (HECO);
(b) polar modified polypropylene (PMP); and
(c) carbon fibers (CF);
to an extruder and extruding the same obtaining said polypropylene composition (C).

The polymer composition (C) may be compounded and pelletized using any of the variety of compounding and blending machines and methods well known and commonly used in the resin compounding art. However, it is preferred using a compounding and blending method that does not affect the carbon fiber dimensions or the dimensions of the fibers other than carbon fibers.

For blending the individual components of the instant composition a conventional compounding or blending apparatus, e.g. a Banbury mixer, a 2-roll rubber mill, Buss-co-kneader or a twin screw extruder may be used. The polymer materials recovered from the extruder/mixer are usually in the form of pellets. These pellets are then preferably further processed, e.g. by injection molding to generate articles and products of the inventive composition.

The Heterophasic Propylene Copolymer (HECO)

It is appreciated that the polypropylene composition (C) shall have well-balanced mechanical properties, in particular a high impact strength in combination with a high elongation a break. In order to achieve these properties it is an essential requirement to include the heterophasic propylene copolymer (HECO).

The heterophasic polypropylene (HECO) may have an MFR$_2$ (230° C., 2.16 kg) measured according to ISO 1133 in the range of not more 60 g/10 min, preferably not more than 25 g/10 min, more preferably not more than 15 g/10 min, like in the range of 2.0 to 60 g/10 min, preferably in the range of 5.0 to 25 g/10 min, more preferably in the range of 7.0 to 14 g/10 min.

The heterophasic polypropylene (HECO) may have a total comonomer content of not more than 40 mol %, preferably not more than 30 mol %, even more preferably not more than 25 mol %, like in the range of 5.0 to 40 mol %, preferably in the range of 10 to 30 mol %, more preferably in the range of 15 to 25 mol %.

The heterophasic polypropylene (HECO) may have a content of xylene cold soluble (XCS) fraction of not more than 55 wt.-%, preferably not more than 45 wt.-%, more preferably not more than 38 wt.-%, like in the range of 10 to 55 wt.-%, preferably in the range of 20 to 45 wt.-%, more preferably in the range of 25 to 38 wt.-%, based on the total weight of the heterophasic polypropylene (HECO).

The heterophasic polypropylene (HECO) may have an intrinsic viscosity (IV) of the xylene cold soluble (XCS) fraction of not more than 4.0 dl/g, preferably not more than 3.5 dl/g, like in the range of 2.8 to 4.0 dl/g, preferably in the range of 3.0 to 3.5 dl/g.

The heterophasic polypropylene (HECO) may have a comonomer content of the xylene cold soluble (XCS) fraction of not more than 65 mol %, preferably not more than 60 mol %, more preferably not more than 50 mol %, like in the range of 30 to 65 mol %, preferably in the range of 35 to 60 wt.-%, more preferably in the range of 45 to 50 mol %.

The heterophasic propylene copolymer (HECO) comprises, preferably consists of
(a) a polypropylene matrix (M) and
(b) an elastomeric copolymer (E) comprising units derived from
propylene and
ethylene and/or $C_4$ to $C_{20}$ alpha-olefins, more preferably from ethylene and/or $C_4$ to $C_{10}$ alpha-olefins and most preferably from ethylene, $C_4$, $C_6$ and/or $C_8$ alpha-olefins, e.g. ethylene and, optionally, units derived from a conjugated diene.

The heterophasic polypropylene (HECO) may have a propylene content of at least 60 mol %, preferably of at least 70 mol %, like in the range of 60 to 95 mol %, preferably in the range of 70 to 90 mol %. The remaining part constitutes the comonomer, i.e. $C_2$ and/or $C_4$ to $C_{20}$ alpha-olefins, more preferably constitutes ethylene. Thus, the heterophasic propylene copolymer (HECO) comprises comonomers, preferably ethylene and/or $C_4$ to $C_{12}$ α-olefin, more preferably ethylene, of not more than 40 mol %, preferably not more than 30 mol %, like in the range of 5.0 to 40 mol %, preferably in the range of 10 to 30 mol %, preferably in the range of 15 to 25 mol %.

As defined herein a heterophasic propylene copolymer (HECO) comprises as polymer components only the polypropylene matrix (M) and the elastomeric copolymer (E).

Throughout the present invention the xylene cold insoluble (XCI) fraction of the heterophasic propylene copolymer (HECO) represents the matrix (M) and optionally the polyethylene, whereas the xylene cold soluble (XCS) fraction represents the elastomeric part of the heterophasic propylene copolymer (HECO), i.e. the elastomeric copolymer (E).

Accordingly the matrix (M) content, i.e. the xylene cold insoluble (XCI) content, in the heterophasic propylene copolymer (HECO) is preferably in the range of 60 to 80 wt.-%, more preferably in the range of 62 to 70 wt.-%, based on the weight of the heterophasic propylene copolymer (HECO).

On the other hand the elastomeric copolymer (E) content, i.e. the xylene cold soluble (XCS) content, in the heterophasic propylene copolymer (HECO) is preferably in the range of 20 to 40 wt.-%, more preferably 30 to 38 wt.-%, based on the weight of the heterophasic propylene copolymer (HECO).

The polypropylene matrix (M) may be a random propylene copolymer (RPP) or a propylene homopolymer (HPP), the latter being especially preferred.

In case the polypropylene matrix (M) is a propylene homopolymer (HPP) the comonomer content of the polypropylene matrix (M) may be equal or below 1.0 wt.-%, preferably equal or below 0.8 wt.-%, more preferably equal or below 0.5 wt.-%, like not more than 0.2 wt.-%, based on the weight of the polypropylene matrix (M).

The expression propylene homopolymer used in the instant invention relates to a polypropylene that consists substantially, i.e. of more than 99.7 wt.-%, still more preferably of at least 99.8 wt.-%, of propylene units, based on the weight of the propylene homopolymer (HPP). In a preferred embodiment only propylene units are detectable in the propylene homopolymer (HPP).

In case the polypropylene matrix (M) is a random propylene copolymer (RPP) it is appreciated that the random propylene copolymer (RPP) comprises monomers co-polymerizable with propylene, for example comonomers such as ethylene and/or $C_4$ to $C_{20}$ alpha-olefins, in particular ethylene and/or $C_4$ to $C_{10}$ alpha-olefins, e.g. ethylene, $C_4$, $C_6$ and/or $C_8$ alpha-olefins. Preferably the random propylene copolymer (RPP) comprises, especially consists of, monomers co-polymerizable with propylene from the group consisting of ethylene, 1-butene and 1-hexene. More specifically the random propylene copolymer (RPP) of this invention comprises—apart from propylene—units derivable from ethylene and/or 1-butene. In a preferred embodiment the random propylene copolymer (RPP) comprises units derivable from ethylene and propylene only.

It is appreciated that the random propylene copolymer (RPP) has preferably a comonomer content in the range of 0.3 to 1.0 wt.-%, more preferably in the range of 0.3 to 0.8 wt.-%, even more preferably in the range of 0.3 to 0.7 wt.-%, based on the weight of the random propylene copolymer (RPP).

The term "random" indicates that the co-monomers of the random propylene copolymers (RPP) are randomly distributed within the units derived from propylene. The term random is understood according to IUPAC (Glossary of basic terms in polymer science; IUPAC recommendations 1996).

As will be explained below, the heterophasic propylene copolymer (HECO) as well as its individual components (matrix and elastomeric copolymer) can be produced by blending different polymer types. However, it is preferred that the heterophasic propylene copolymer (HECO) as well as its individual components (matrix and elastomeric copolymer) are produced in a sequential step process, using reactors in serial configuration and operating at different reaction conditions.

Further, it is appreciated that the polypropylene matrix (M) of the heterophasic propylene copolymer (HECO) has a moderate melt flow $MFR_2$, determined according to ISO1133 under a load of 2.16 kg and at a temperature of 230° C. As stated above the melt flow rate $MFR_2$ (230° C., 2.16 kg) measured according to ISO1133 of the polypropylene matrix (M) equates with the melt flow rate $MFR_2$ of the xylene cold insoluble (XCI) fraction of the heterophasic propylene copolymer (HECO). Thus it is preferred that the xylene cold insoluble (XCI) fraction of the heterophasic propylene copolymer (HECO), i.e. the polypropylene matrix (M), has a melt flow rate $MFR_2$ (230° C., 2.16 kg) measured according to ISO1133 in the range of 20.0 to 150.0 g/10 min, more preferably in the range of 25.0 to 110 g/10 min, even more preferably in the range of 30.0 to 100 g/10 min, yet even more preferably of 35.0 to 90 g/10 min.

Preferably, the polypropylene matrix (M) is isotactic. Accordingly it is appreciated that the polypropylene matrix (M) has a rather high pentad concentration, i.e. higher than 80%, preferably higher than 85%, more preferably higher than 90%, even more preferably higher than 92%, yet even more preferably higher than 93%, like higher than 95%.

The second component of the heterophasic propylene copolymer (HECO) is the elastomeric copolymer (E).

The elastomeric copolymer (E) comprises, preferably consists of, units derivable from (i) propylene and (ii) ethylene and/or $C_4$ to $C_{20}$ alpha-olefins, more preferably from ethylene and/or $C_4$ to $C_{10}$ alpha-olefins and most preferably from ethylene, $C_4$, $C_6$ and/or $C_8$ alpha-olefins, e.g. ethylene. The elastomeric copolymer (E) may additionally contain units derived from a conjugated diene, like butadiene, or a non-conjugated diene, however it is preferred that the elastomeric copolymer (E) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

In the present invention the content of units derivable from propylene in the elastomeric copolymer (E) equates with the content of propylene detectable in the xylene cold soluble (XCS) fraction. Accordingly the propylene detectable in the xylene cold soluble (XCS) fraction ranges from 50.0 to 75.0 wt.-%, more preferably from 55.0 to 70.0 wt.-%, and still more preferably from 58.0 to 67.0 wt.-%, based on the weight of the total weight of the xylene cold soluble (XCS) fraction. Thus, in a specific embodiment the elastomeric copolymer (E), i.e. the xylene cold soluble (XCS) fraction, comprises from 25.0 to 50.0 wt.-%, preferably 30.0 to 45.0 wt.-%, more preferably 33.0 to 42.0 wt.-% units derivable from ethylene and/or at least another $C_4$ to $C_{20}$ α-olefin. Preferably the elastomeric copolymer (E) is an ethylene propylene non-conjugated diene monomer polymer (EPDM) or an ethylene propylene rubber (EPR), the latter especially preferred, with a propylene and/or ethylene content as defined in this paragraph.

The polypropylene composition (C) contains preferably an alpha-nucleating agent. Even more preferred the present invention is free of beta-nucleating agents. The nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl)phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Such additives are generally commercially available and are described, for example, in "Plastic Additives Handbook", 5th edition, 2001 of Hans Zweifel.

Most preferably the alpha-nucleating agent is part of the heterophasic propylene copolymer (HECO) and thus of the polypropylene composition (C). Accordingly the alpha-nucleating agent content of the heterophasic propylene copolymer (HECO) is preferably up to 5.0 wt.-%, based on the weight of the heterophasic propylene copolymer (HECO). In a preferred embodiment, the heterophasic propylene copolymer (HECO) contain(s) not more than 3000 ppm, more preferably of 1 to 2000 ppm of an alpha-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

In a preferred embodiment the heterophasic propylene copolymer (HECO) and thus the polypropylene composition (C) contains a vinylcycloalkane, like vinylcyclohexane (VCH), polymer and/or vinylalkane polymer, as the alpha-nucleating agent. Preferably, in this embodiment the heterophasic propylene copolymer (HECO) contains a vinylcycloalkane, like vinylcyclohexane (VCH), polymer and/or vinylalkane polymer, preferably vinylcyclohexane (VCH). Preferably the vinylcycloalkane is vinylcyclohexane (VCH) polymer which is introduced into the heterophasic propylene copolymer (HECO) and thus into the polypropylene composition (C) by the BNT technology. More preferably in this preferred embodiment, the amount of vinylcycloalkane, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm, and the amount of vinylcycloalkane, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm. Accordingly it is thus preferred that the polypropylene composition (C) contains not more than 500 ppm, more preferably of 0.1 to 200 ppm, most preferably 0.2 to 100 ppm, of vinylcycloalkane, like vinylcyclohexane (VCH) polymer.

With regard to the BNT-technology reference is made to the international applications WO 99/24478, WO 99/24479 and particularly WO 00/68315. According to this technology a catalyst system, preferably a Ziegler-Natta procatalyst, can be modified by polymerising a vinyl compound in the presence of the catalyst system, comprising in particular the special Ziegler-Natta procatalyst, an external donor and a cocatalyst, which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene according to this invention, i.e. of the heterophasic propylene copolymer (HECO). The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

The nucleating agent can be introduced as a master batch. In this case a master batch contains a nucleating agent, which is preferably a polymeric nucleating agent, more preferably alpha-nucleating agent, most preferably a vinylcycloalkane, like vinylcyclohexane (VCH), polymer and/or vinylalkane polymer, preferably vinylcyclohexane (VCH)

polymer, as defined above or below, in an amount of not more than 500 ppm, more preferably of 1 to 200 ppm, and still more preferably of 5 to 100 ppm, based on the weight of the master batch. In this embodiment, more preferably, said master batch is present in an amount of not more than 10.0 wt.-%, more preferably not more than 5.0 wt.-% and most preferably not more than 3.5 wt.-%, based on the total amount of the heterophasic propylene copolymer (HECO). Most preferably the master batch comprises, preferably consists of a polymer which has been nucleated according to BNT-technology.

The heterophasic propylene copolymer (HECO) according to this invention is preferably produced in a sequential polymerization process, i.e. in a multistage process known in the art, wherein the corresponding matrix, i.e. the polypropylene matrix (M), is produced in at least in one slurry reactor and optionally in at least one gas phase reactor, preferably in one slurry reactor and one gas phase reactor, subsequently the elastomeric copolymer (E) is produced in at least one gas phase reactor, preferably in two gas phase reactors.

More precisely, the heterophasic propylene copolymer (HECO) is obtained by producing the polypropylene matrix (M) in at least one reactor system, said system comprises at least one reactor, transferring said polypropylene matrix (M) into a subsequent reactor system, said system comprises at least one reactor, where in the presence of the polypropylene matrix (M) the elastomeric propylene copolymer (E) is produced.

Thus, each of the polymerization systems can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably, the process for the preparation of the heterophasic propylene copolymer (HECO) comprises also a prepolymerisation with the chosen catalyst system, as described in detail below, comprising the Ziegler-Natta procatalyst, the external donor and the cocatalyst.

In a preferred embodiment, the prepolymerisation is conducted as bulk slurry polymerization in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerisation conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60.0 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

The particularly preferred embodiment for the preparation of the heterophasic propylene copolymer (HECO) of the invention comprises carrying out the polymerization in a process comprising either a combination of one loop and one or two or three gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably, the heterophasic propylene copolymer (HECO) is produced by using a special Ziegler-Natta procatalyst in combination with a special external donor, as described below in detail, preferably in the Spheripol® or in the Borstar®-PP process.

One preferred multistage process may therefore comprise the steps of:

producing the first part of the polypropylene matrix (M-1) in the presence of the chosen catalyst system, as for instance described in detail below, comprising the special Ziegler-Natta procatalyst (i), an external donor (iii) and the cocatalyst (ii) in a slurry reactor, like a loop reactor;

transferring the reactor product of the slurry reactor, like a loop reactor into a first gas phase reactor;

producing the second part of the polypropylene matrix (M-2) in the presence of the first part of the polypropylene matrix (M-1) and in the presence of the catalyst system obtained from the slurry reactor, like the loop reactor obtaining the polypropylene matrix (M);

transferring the reactor product of the first gas phase reactor into a second gas phase reactor, producing the first part of the elastomeric copolymer (E-1) in the presence of the polypropylene matrix (M) and the catalyst system obtained from the first gas phase reactor;

transferring the reactor product of the second gas phase reactor into a third gas phase reactor, producing the second part of the elastomeric copolymer (E-2) in the presence of the polypropylene matrix (M), the first part of the elastomeric copolymer (E-1) and the catalyst system obtained from the second gas phase reactor obtaining the heterophasic propylene copolymer (HECO);

recovering the heterophasic propylene copolymer (HECO).

With respect to the above-mentioned preferred slurry-gas phase process, the following general information can be provided with respect to the process conditions.

The temperature is preferably from 40 to 110° C., preferably between 50 and 100° C., in particular between 60 and 90° C., with a pressure in the range of from 5 to 80 bar, preferably 10 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

If desired, the polymerization may be effected in a known manner under supercritical conditions in the slurry, preferably loop reactor, and/or as a condensed mode in the gas phase reactor.

According to the invention the heterophasic polypropylene is preferably obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

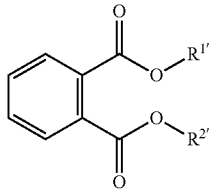

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566, EP 591224 and EP 586390. The content of these documents is herein included by reference.

First an adduct of $MgCl_2$ and a $C_1$-$C_2$ alcohol of the formula $MgCl_2 \cdot nROH$, wherein R is methyl or ethyl and n is 1 to 6, is formed. Ethanol is preferably used as alcohol. The adduct, which is first melted and then spray crystallized or emulsion solidified, is used as catalyst carrier.

In the next step the spray crystallized or emulsion solidified adduct of the formula $MgCl_2 \cdot nROH$, wherein R is methyl or ethyl, preferably ethyl and n is 1 to 6, is contacting with $TiCl_4$ to form a titanised carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

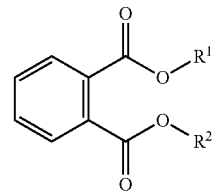

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2 \cdot nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

In a further embodiment, as outlined above, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

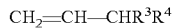

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene composition according to this invention. The polymerized vinyl compound can act as an α-nucleating agent. This modification is in particular used for the preparation of the heterophasic polypropylene (HECO).

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the heterophasic polypropylene according to the invention, the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

wherein $R^x$ and $R^y$ can be the same or different, representing a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

Most preferably the external donor is of formula (IIIa), like dicyclopentyl dimethoxy silane [Si(OCH$_3$)$_2$(cyclo-pentyl)$_2$] or diisopropyl dimethoxy silane [Si(OCH$_3$)$_2$(CH(CH$_3$)$_2$)$_2$], particularly dicyclopentyl dimethoxy silane [Si(OCH$_3$)$_2$(cyclo-pentyl)$_2$].

The polypropylene composition (C) may comprise the heterophasic propylene copolymer (HECO) in an amount of 55 to 95 parts per weight, preferably in an amount of 73 to 92 parts per weight, more preferably in an amount of 79 to 90 parts per weight, wherein the parts by weight are based on the total parts by weight of heterophasic propylene copolymer (HECO), polar modified polypropylene (PMP) and the carbon fibers (CF).

In one embodiment the polypropylene composition (C) comprises the heterophasic propylene copolymer (HECO) in an amount of 55 to 95 parts per weight, wherein the parts by weight are based on the total parts by weight of heterophasic propylene copolymer (HECO), polar modified polypropylene (PMP) and the carbon fibers (CF).

In one embodiment the polypropylene composition (C) comprises the heterophasic propylene copolymer (HECO) in an amount of 79 to 90 parts per weight, wherein the parts by weight are based on the total parts by weight of heterophasic propylene copolymer (HECO), polar modified polypropylene (PMP) and the carbon fibers (CF).

The polypropylene composition may comprise the heterophasic propylene copolymer (HECO) in an amount of at least 55 wt.-%, preferably at least 73 wt.-%, more preferably at least 79 wt.-%, like in the range of 55 to 95 wt.-%, preferably in the range of 73 to 92 wt.-%, more preferably in the range of 79 to 90 wt.-% based on the total weight of the polypropylene composition (C).

In one embodiment the polypropylene composition (C) comprises the heterophasic propylene copolymer (HECO) in an amount of 55 to 95 wt.-%, based on the total weight of the polypropylene composition (C).

In one embodiment the polypropylene composition (C) comprises the heterophasic propylene copolymer (HECO) in an amount of 79 to 90 parts per weight, based on the total weight of the polypropylene composition (C).

The Polar Modified Polypropylene (PMP)

In order to achieve an easier and more uniform dispersion of the carbon fibers (CF) in the polymer components, which act in the as a matrix for the carbon fibers (CF) in the polypropylene composition (C), a polar modified polypropylene (PMP) is applied as a coupling agent.

The polar modified polypropylene (PMP) preferably is a polypropylene containing polar groups.

In the following the polypropylene will be defined more precisely which is subsequently modified to the polar modified polypropylene (PMP) as explained in detail below.

The polypropylene is preferably a propylene homopolymer or a random propylene copolymer, like a copolymer of (i) propylene and (ii) ethylene and/or $C_4$ to $C_{12}$ α-olefins, preferably from (i) propylene and (ii) an α-olefin selected from the group consisting of ethylene, 1-butene, 1-hexene, 1-octene, and mixtures thereof, preferably ethylene only.

In one embodiment, the polar modified polypropylene (PMP) is a modified random propylene copolymer, wherein said random propylene copolymer comprises ethylene as the only comonomer unit.

Concerning the definition of the term "random propylene copolymer" reference is made to the information provided above discussing the heterophasic propylene copolymer (HECO).

Preferably, the units derivable from propylene constitutes the main part of the random propylene copolymer, i.e. at least 90.0 wt.-%, more preferably in the range of 92.0 to 99.5 wt.-%, yet more preferably of 92.5 to 98.0 wt.-%, yet even more preferably of 93.0 to 96.0 wt.-%, based on the total weight of the random propylene copolymer. Accordingly, the amount of units derived from ethylene and/or $C_4$ to $C_{12}$ α-olefins, preferably derived from ethylene, in the random propylene copolymer is at most 10 wt.-%, more preferably in the range of 0.5 to 8.0 wt.-%, even more preferably in the range of 2.0 to 7.5 wt.-%, yet even more preferably in the range of 4.0 to 7.0 wt.-%, based on the total weight of the random propylene copolymer.

It is in particular appreciated that the random propylene copolymer only comprises units derivable from propylene and ethylene. The comonomer amounts given in this paragraph belong preferably to the random propylene copolymer which is not modified.

It is appreciated that the random propylene copolymer, i.e. the non-modified random propylene copolymer, has a melting temperature $T_m$ in the range of 125 to 140° C., more preferably ranges from 128 to 138° C. and most preferably ranges from 131 to 136° C. The melting temperature given in this paragraph is the melting temperature of the non-modified random propylene copolymer.

It is appreciated that the random propylene copolymer, i.e. the non-modified random propylene copolymer, has a melt flow rate $MFR_2$ (230° C.) measured according to ISO 1133 in the range from 1 to 30 g/10 min, preferably in the range of 1 to 20 g/10 min, more preferably in the range of 1 to 10 g/10 min, and most preferably in the range of 2 to 6 g/10 min.

It is appreciated that the polar modified polypropylene (PMP) comprises groups derived from polar groups. In this context, preference is given to polar modified polypropylene (PMP) comprising groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar groups are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

In terms of structure, the polar modified polypropylene (PMP) is preferably selected from graft or block copolymers preferably of the above defined polypropylene, like the above defined random propylene copolymer.

Preferably the polar modified polypropylene (PMP), i.e. the coupling agent, is a polypropylene, like the random propylene copolymer as defined above in the section "the polyar modfied propylene (PMP) as coupling agent", grafted with such polar group.

Particular preference is given to using a polypropylene, like the random propylene copolymer as defined above in the section "The Polar Modified Propylene (PMP)" grafted with maleic anhydride as the polar modified polypropylene (PMP), i.e. the coupling agent.

In one embodiment, the polar modified polypropylene (PMP) is a random propylene copolymer as defined above grafted with maleic anhydride. Thus in one specific preferred embodiment the polar modified polypropylene (PMP) is a random propylene ethylene copolymer grafted with maleic anhydride, more preferably wherein the ethylene content based on the total amount of the random propylene ethylene copolymer is in the range of 2.0 to 7.5 wt.-%, more preferably in the range of 4.0 to 7.0 wt.-%.

In order to achieve the desired dispersion of the carbon fibers (CF) in the polymer components ensuring that the polymer composition (C) provides the well-balanced mechanical properties, in particular a high impact strength in combination with a high elongation a break at low density, it is appreciated that the polar modified polypropylene (PMP) comprises an amount of groups deriving from polar groups which is higher than that typically used in polar modified polypropylenes considered for polypropylenes.

The polar modified polypropylene (PMP) may comprise groups deriving from polar groups in an amount in the range of 0.5 to 5.0 wt.-%, preferably in the range of 1.0 to 4.0 wt.-%, more preferably in the range of 1.5 to 3.0 wt.-%, even more preferably in the range of 1.7 to 2.3 wt.-%, based on the total weight of the polar modified polypropylene (PMP).

The polar modified polypropylene (PMP) may have a melt flow volume rate MVI (170° C.; 1.2 kg) measured according to ISO 1133 in the range of 20 to 150 cm³/10 min, preferably in the range of 40 to 100 cm³/10 min.

In one embodiment the polar modified polypropylene (PMP) is a random propylene ethylene copolymer grafted with maleic anhydride with an ethylene content based on the total amount of the random propylene ethylene copolymer is in the range of 2.0 to 7.5 wt.-%, having groups deriving from polar groups in an amount in the range of 0.5 to 5.0 wt.-% and a melt flow volume rate MVI (170° C.; 1.2 kg) measured according to ISO 1133 in the range of 20 to 150 cm³/10 min.

In one embodiment the polar modified polypropylene (PMP) is a random propylene ethylene copolymer grafted with maleic anhydride with an ethylene content based on the total amount of the random propylene ethylene copolymer is in the range of 2.0 to 3.0 wt.-%, having groups deriving from polar groups in an amount in the range of 1.5 to 3.0 wt.-% and a melt flow volume rate MVI (170° C.; 1.2 kg) measured according to ISO 1133 in the range of 40 to 100 cm³/10 min.

In one embodiment the polar modified polypropylene (PMP) is a random propylene ethylene copolymer grafted with maleic anhydride with an ethylene content based on the total amount of the random propylene ethylene copolymer is in the range of 2.0 to 2.8 wt.-%, having groups deriving from polar groups in an amount in the range of 1.7 to 2.3 wt.-% and a melt flow volume rate MVI (170° C.; 1.2 kg) measured according to ISO 1133 in the range of 40 to 100 cm³/10 min.

Additionally or alternatively, it is appreciated that the polar modified polypropylene (PMP) preferably has a melting temperature $T_m$ in the range of 120 to 150° C., more preferably ranges from 125 to 145° C. and most preferably ranges from 130 to 140° C.

The polar modified polypropylene (PMP) can be produced in a simple manner by a two-step grafting process comprising a solid stage as a first step and a melt stage as a second step. Such process steps are well known in the art.

The polar modified polypropylene (PMP) is known in the art and commercially available. A suitable example is SCONA TSPP 10213 GB of BYK.

The polypropylene composition (C) may comprise the polar modified polypropylene (PMP) in an amount in the range of 1.0 to 10 parts by weight, preferably in the range of 2.5 to 10 parts per weight, more preferably in the range of 3.0 to 7.0 parts per weight, more preferably in the range of 3.0 to 6.0 parts per weight, based on the total parts by weight of heterophasic propylene copolymer (HECO), polar modified polypropylene (PMP) and the carbon fibers (CF).

In one embodiment the polypropylene composition (C) comprises the polar modified polypropylene (PMP) in an amount in the range of 1.0 to 10 parts per weight, based on the total parts by weight of heterophasic propylene copolymer (HECO), polar modified polypropylene (PMP) and the carbon fibers (CF).

In one embodiment the polypropylene composition (C) comprises the polar modified polypropylene (PMP) in an amount in the range of 2.5 to 10 parts per weight, based on the total parts by weight of heterophasic propylene copolymer (HECO), polar modified polypropylene (PMP) and the carbon fibers (CF).

In one embodiment the polypropylene composition (C) comprises the polar modified polypropylene (PMP) in an amount in the range of 3.0 to 6.0 parts per weight, based on the total parts by weight of heterophasic propylene copolymer (HECO), polar modified polypropylene (PMP) and the carbon fibers (CF).

The polypropylene composition may comprise the polar modified polypropylene (PMP) in an amount of at least 1.0 wt.-%, preferably at least 2.5 wt.-%, more preferably at least 3.0 wt.-%, like an amount in the range of 1.0 to 10 wt.-%, preferably in the range of 2.5 to 10 wt.-%, more preferably in the range of 3.0 to 7.0 wt.-%, based on the total weight of the polypropylene composition (C).

In one embodiment the polypropylene composition (C) comprises the polar modified polypropylene (PMP) in an amount in the range of 1.0 to 10 wt.-%, based on the total weight of the polypropylene composition (C).

In one embodiment the polypropylene composition (C) comprises the polar modified polypropylene (PMP) in an amount in the range of 2.5 to 10 wt.-%, based on the total weight of the polypropylene composition (C).

In one embodiment the polypropylene composition (C) comprises the polar modified polypropylene (PMP) in an amount in the range of 3.0 to 6.0 parts per weight, based on the total weight of the polypropylene composition (C).

Preferably the polar modified polypropylene (PMP) is the only polar modified polypropylene present in the polypropylene composition (C). In one embodiment the polar modified polypropylene (PMP) is the only polar modified polypropylene present in the polypropylene composition (C).

The Carbon Fibers (CF)

It is appreciated that the polypropylene composition (C) shall have well-balanced mechanical properties, in particular a high impact strength in combination with a high elongation a break. In order to achieve these properties it is an essential requirement to include carbon fibers (CF).

The carbon fibers (CF) may have an average diameter in the range of 2 to 30 µm, preferably in the range of 3 to 25 µm, more preferably in the range of 5 to 20 µm The carbon fibers (CF) may have a density in the range of 1.0 to 2.5 g/cm$^3$, preferably in the range of 1.5 to 2.3 g/cm$^3$, more preferably in the range of 1.7 to 2.0 g/cm$^3$.

It should be noted that the carbon fibres are not considered to be a polymeric material. Furthermore, the carbon fibers (CF) are not regarded as being encompassed by the term "additives (AD)" as defined in more detail below.

The carbon fibers (CF) may be in the form of a non-woven fabric. The non-woven fabric preferably comprises at least 50 wt.-% carbon fibers (CF), more preferably at least 65 wt.-% carbon fibers, even more preferably at least 75 wt.-% carbon fibers (CF) and most preferably at least 80 wt.-%, based on the total weight of the non-woven fabric.

The non-woven fabric according to the invention may comprise polymeric compounds such as sizing agents and/or sewing threads. It is appreciated that the sizing agents and/or sewing threads are not comprised in an amount exceeding 10 wt.-%, preferably 7.5 wt.-% even more preferably 3 wt.-%, based on the weight of the carbon fiber (CF). Sizing agents and/or sewing threads are considered as being encompassed by the term "carbon fiber (CF)" and do not resemble further polymer compounds.

If present, the amount of sewing thread is normally within the range of 0.25 to 10 wt.-%, preferably within the range of 0.5 to 7.5 wt.-% and most preferably within the range of 1.0 to 3.0 wt.-% based on the total weight of the non-woven fabric. Suitable sewing threads are for example polyester fibers. As indicated above, a sewing threads are considered as being encompassed by the term "carbon fiber (CF)" and do not resemble further polymer compounds.

If present, the amount of sizing agent is typically within the range of 0.25 to 15 wt.-%, preferably 0.5 to 10 wt.-%, more preferably 1.0 to 7.5 wt.-%, based on the weight of the carbon fibers (CF). Suitable sizing agents are for example epoxy resins, polyether-modified epoxy resins, polyurethane, amino-silane grafted polypropylene. As indicated above, sizing agents are considered as being encompassed by the term "carbon fiber (CF)" and do not resemble further polymer compounds.

It is appreciated that the non-woven fabric may be a recycled material which may contain additional compounds besides the carbon fibers, such as minor amounts of glass fiber, depending on the first use. These additional compounds are considered as being encompassed by the term "carbon fiber (CF)" and do not resemble further compounds, in particular no further polymer compounds and/or fiber compounds.

It is appreciated that these additional compounds, such as glass fiber, are not comprised in an amount exceeding 10 wt.-%, preferably 5 wt.-% even more preferably 3 wt.-%, based on the weight of the carbon fiber (CF). In one embodiment the carbon fiber (CF) does not comprise glass fibers in an amount exceeding 5 wt.-%, based on the weight of the carbon fiber (CF). In one embodiment the carbon fiber (CF) does not comprise glass fibers.

In case the carbon fibers (CF) are in the form of a non-woven fabric, the non-woven fabric is preferably in the form of a stripe.

Usually the width of the stripe is not more than 300 mm. Preferably the stripe has a width of 10 to 300 mm, preferably a width of 25 to 250 mm and most preferably a width of 40 to 200 mm Additionally or alternatively, the stripe preferably has a length of at least 50 cm, more preferably of at least 150 cm, and most preferably of at least 250 cm.

The stripe may be in the form of a reel. Thus, the length is not particularly limited. However, the length is not particularly limited, i.e. the stripe may be a so-called "endless stripe".

The average weight of the non-woven fabric is preferably within the range of 100 to 1000 g/m$^2$, more preferably within the range of 150 to 800 g/m$^2$ and most preferably within the range of 250 to 650 g/m$^2$.

The non-woven fabric is further characterised by a constant weight per area. Thus, the difference in weight between two sections of the non-woven fabric having an identical area expressed as the quotient of the section having the higher weight to the section having the lower weight is preferably within 10%, more preferably within 5%.

The preparation of non-woven fabric from carbon fibers (CF), e.g. rovings, or recycled material which may be in the form of a laid web, is well-known in the art. Suitable processes are, for example needle punching.

Preferably, the non-woven fabric is in the form of a non-woven fabric, preferably obtained by needle-punching.

The polypropylene composition (C) may comprise the carbon fibers (CF) in an amount of 2.5 to 35 parts per weight, preferably in an amount of 5.0 to 20 parts per weight, more preferably in the range of 7.0 to 15 parts per weight, even more preferably in the range of 8.5 to 12.5 parts per weight, wherein the parts by weight are based on the total parts by weight of heterophasic propylene copolymer (HECO), polar modified polypropylene (PMP) and carbon fibers (CF).

In one embodiment the polypropylene composition (C) comprises the carbon fibers (CF) in an amount in the range of 2.5 to 35 parts per weight, wherein the parts by weight are based on the total parts by weight of heterophasic propylene copolymer (HECO), polar modified polypropylene (PMP) and carbon fibers (CF).

In one embodiment the polypropylene composition (C) comprises the carbon fibers (CF) in an amount in the range of 8.5 to 12.5 parts per weight, wherein the parts by weight are based on the total parts by weight of heterophasic propylene copolymer (HECO), polar modified polypropylene (PMP) and carbon fibers (CF).

The polypropylene composition may comprise the carbon fibers (CF) in an amount of at least 2.5 wt.-%, preferably at least 5.0 wt.-%, more preferably at least 7.0 wt.-%, even more preferably at least 8.5 wt.-%, like an amount in the range of 2.5 to 35 wt.-%, preferably in the range of 5.0 to 20 wt.-%, even more preferably in the range of 7.0 to 15.0 wt.-%, yet even more preferably in the range of 8.5 to 12.5 wt.-%, based on the total weight of the polypropylene composition (C).

In one embodiment the polypropylene composition (C) comprises the carbon fibers (CF) in an amount in the range of 2.5 to 35 wt.-%, based on the total weight of the polypropylene composition (C).

In one embodiment the polypropylene composition (C) comprises the carbon fibers (CF) in an amount in the range of 8.5 to 12.5 parts per weight, based on the total weight of the polypropylene composition (C).

Preferably the carbon fibers (CF) are the only fibers present in the polypropylene composition (C).

In one embodiment the polypropylene composition (C) does not comprise fibers selected from the group consisting of glass fibers, metal fibers, mineral fibers, ceramic fibers and mixtures thereof.

In one embodiment the polypropylene composition (C) does not comprise fibers obtained from an inorganic material.

The Additives (AD)

In addition to the heterophasic propylene copolymer (HECO), the polar modified polypropylene (PMP) and the carbon fibers (CF) polypropylene composition (C) may comprise additives (AD).

Typical additives are acid scavengers, antioxidants, colorants, light stabilisers, plasticizers, slip agents, anti-scratch agents, dispersing agents, processing aids, lubricants, pigments, antistatic agent, and the like.

Such additives are commercially available and for example described in "Plastic Additives Handbook", 6$^{th}$ edition 2009 of Hans Zweifel (pages 1141 to 1190).

As indicated above the term "additives (AD)" does not include fibers, such as carbon fibers, glass fibers, metal fibers, mineral fibers and ceramic fibers. In other words, the carbon fibers (CF) are not regarded as an additive.

However, the term "additives (AD)" may also include carrier materials, in particular polymeric carrier materials (PCM).

The polypropylene composition (C) may comprise the additives (AD) in an amount of up to 10 wt.-%, preferably in an amount in the range of 0.01 to 10 wt.-%, more preferably in an amount in the range of 0.05 to 5 wt.-%, even more preferably in an amount in the range of 0.1 to 2.5 wt.-%, based on the weight of the polypropylene composition (C).

The polypropylene composition (C) may comprise additives selected from the group of antioxidant, acid scavenger, anti-scratch agent, mould-release agent, lubricant, UV stabiliser and mixtures thereof.

The additives (AD) may be included into the polypropylene composition (C) as a separate ingredient. Alternatively, the additives (AD) may be included into the polypropylene composition (C) together with at least one other component. For example the additives (AD) may be added to the polymer composition (C) together the heterophasic propylene copolymer (HECO), the polar modified polypropylene (PMP) and/or the carbon fibers (CF), preferably in form of a master batch (MB). Hence, terms "heterophasic propylene copolymer (HECO)", "polar modified polypropylene (PMP)" and "carbon fibers (CF)" may be directed at a composition including additives (AD). Additives other than the polymeric carrier materials (PCM) are typically added to the polypropylene composition (C) together with polymeric carrier materials (PCM) in form of a master batch (MB).

Thus, a polypropylene composition (C) consisting of the heterophasic propylene copolymer (HECO), the polar modified polypropylene (PMP) and the carbon fibers (CF) may also comprise additives (AD).

The Polymeric Carrier Material (PCM)

As indicated above, in a preferred embodiment the polypropylene composition (C) does not comprise other polymers besides the heterophasic propylene copolymer (HECO) and the polar modified polypropylene (PMP) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the polypropylene composition (C). If an additional polymer is present, such a polymer is typically a polymeric carrier material (PCM) for additives.

The polymeric carrier material (PCM) is a carrier polymer for the other additives to ensure a uniform distribution in the polypropylene composition (C). The polymeric carrier material (PCM) is not limited to a particular polymer. The polymeric carrier material (PCM) may be ethylene homopolymer, ethylene copolymer obtained from ethylene and a-olefin comonomer such as $C_3$ to $C_8$ α-olefin comonomer, propylene homopolymer, propylene copolymer obtained from propylene and α-olefin comonomer such as ethylene and/or $C_4$ to $C_8$ α-olefin comonomer and mixtures thereof.

Typically the polymeric carrier material (PCM) as such does not contribute to the improved properties of the polypropylene composition (C) described.

The Article

The present invention is further directed at an article comprising the polypropylene composition (C).

The article may comprise the polypropylene composition in an amount of at least 80 wt.-%, like 80 to 99.9 wt.-%, preferably in an amount of at least 90 wt.-%, like 90 to 99.9 wt.-%, more preferably in an amount of at least 95 wt.-%, like 95 to 99.9 wt.-%.

The article may be a molded article or an extruded article, preferably the article is a molded article, like an injection molded article or a compression molded article.

In a preferred embodiment the article is an automotive article, in particular an automotive exterior or interior article, such as instrumental carriers, shrouds, structural carriers, bumpers, side trims, step assists, body panels, spoilers, dashboards, interior trims and the like.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy is used to quantify the isotacticity and regio-regularity of the polypropylene homopolymers.

Quantitative $^{13}C$ {$^{1}H$} NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C$ {$^{1}H$} NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253;; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio-defects:

$$P_{total}=P_{12}+P_{21e}$$

The mole percent of 2,1- erythro regio-defects was quantified with respect to all propene:

[21e] mol.-%=100*($P_{21e}/P_{total}$)

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W -J. Wang and S. Zhu, Macromolecules 2000, 33 1157, through integration of multiple signals across the whole spectral region in the $^{13}C$ {$^{1}H$} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

The xylene Cold Solubles (XCS) are measured at 25° C. according ISO 16152; first edition; 2005-07-01.

The Intrinsic Viscosity is measured according to DIN ISO 1628/1, October 1999 (in Decalin at 135° C.).

The Tensile Modulus; is measured according to ISO 527-2 (cross head speed=1 mm/min; 23° C.) using injection molded specimens as described in EN ISO 1873-2 (dog bone shape, 4 mm thickness).

Tensile strength; Tensile Elongation at Break are measured according to ISO 527-2 (cross head speed=50 mm/min; 23° C.) using injection molded specimens as described in EN ISO 1873-2 (dog bone shape, 4 mm thickness).

The Charpy Impact Strength is determined according to ISO 179 1eU at 23° C. by using an 80×10×4 $mm^3$ test bars injection molded in line with EN ISO 1873-2.

The Average Fiber Diameter is determined according to ISO 1888:2006(E), Method B, microscope magnification of 1000.

The Melt Flow Rate (MFR$_2$) is measured according to ISO 1133 at the temperature and load given.

The Melt Flow Volume Rate (MVI) is measured according to ISO 1133 at the temperature and load given.

The Density is measured according to ISO 1183-187. Sample preparation is done by compression molding in accordance with ISO 1872-2:2007.

The DSC Analysis, Melting Temperature (Tm) and Melting Enthalpy (Hm), Crystallization Temperature (Tc) and Crystallization Enthalpy (Hc) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and crystallization enthalpy (Hc) are determined from the cooling step, while melting temperature and melting enthalpy (Hm) are determined from the second heating step.

2. Examples

The present invention is illustrated by the following examples:

Production of the Heterophasic Propylene Copolymer (HECO)

Catalyst Preparation:

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications WO 87/07620, WO 92/19653, WO 92/19658 and EP 0 491 566, EP 591224 and EP 586390. The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt %) was added and after additionally 20 minutes 5.0 g of vinylcyclohexane (VCH) was added.).The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight. As external donor di(cyclopentyl) dimethoxy silane (donor D) was used.

HECO Preparation

The HECO is prepared in a slurry and multiple gas phase reactors connected in series. The conditions applied and the properties of the products obtained are summarized in Table 1.

TABLE 1

| Preparation of the HECO | | | |
|---|---|---|---|
| Prepolymerization | | | |
| TEAL/Ti | [mol/mol] | 220 | |
| TEAL/Do | [mol/mol] | 7.3 | |
| Temperature | [° C.] | 30 | |
| Residence time | [h] | 0.08 | |
| Loop | | | |
| Temperature | [° C.] | 72 | |
| Split | [%] | 35 | |
| H2/C3 | [mol/kmol] | 15 | |
| C2/C3 | [mol/kmol] | 0 | |
| MFR$_2$ | [g/10 min] | 55 | |
| XCS | [wt.-%] | 2.0 | |
| C2 | [mol-%] | 0 | |
| 1$^{st}$ GPR | | | |
| Temperature | [° C.] | 80 | |
| Pressure | [kPa] | 2231 | |
| Split | [%] | 30 | |
| H2/C3 | [mol/kmol] | 150 | |
| C2/C3 | [mol/kmol] | 0 | |
| MFR$_2$ | [g/10 min] | 55 | |
| XCS | [wt.-%] | 2.0 | |
| C2 | [mol-%] | 0 | |
| 2$^{nd}$ GPR | | | |
| Temperature | [° C.] | 70 | |
| Pressure | [kPa] | 2291 | |
| Split | [%] | 19 | |
| C2/C3 | [mol/kmol] | 584 | |
| H2/C2 | [mol/kmol] | 117 | |
| MFR$_2$ | [g/10 min] | 11 | |
| XCS | [wt.-%] | 18 | |
| IV (XCS) | [dl/g] | nd | |
| C2 (XCS) | [mol-%] | nd | |
| C2 | [mol-%] | 18 | |
| 3$^{rd}$ GPR | | | |
| Temperature | [° C.] | 85 | |
| Pressure | bar | 1421 | |
| Split | [%] | 16 | |
| C2/C3 | [mol/kmol] | 585 | |
| H2/C2 | [mol/kmol] | 93 | |
| MFR$_2$ | [g/10 min] | 11 | |
| XCS | [wt.-%] | 32 | |
| IV (XCS) | [dl/g] | 3.1 | |
| C2 (XCS) | [mol-%] | 48 | |
| C2 | [mol-%] | 19 | |

C2 ethylene content
H2/C3 hydrogen/propylene ratio
C2/C3 ethylene/propylene ratio
H2/C2 hydrogen/ethylene ratio
1$^{st}$ 2$^{nd}$ 3$^{rd}$ GPR 1$^{st}$ 2$^{nd}$ 3$^{rd}$ gas phase reactor
Loop loop reactor
TEAL/Ti TEAL/Ti ratio
TEAL/Do TEAL/Donor ratio
MFR$_2$ melt flow rate
XCS xylene cold soluble fraction
C2 (XCS) ethylene content of the xylene cold soluble fraction
IV (XCS) intrinsic viscosity of the xylene cold soluble fraction The properties of the products obtained from the individual reactors naturally are not determined from homogenized material but from reactor samples (spot samples). The properties of the final resin are measured on homogenized material.

The Inventive Example IE1 and the Comparative Examples CE1 and CE 2 are prepared by melt blending with a twin-screw extruder such as the Coperion STS-35 twin-screw extruder from the Coperion (Nanjing) Corporation, China. The twin-screw extruder runs at an average screw speed of 400 rpm with a temperature profile of zones from 180 to 250° C. The Inventive Example IE1 and the Comparative Examples CE1 and CE 2 are based on the recipe summarized in Table 2.

TABLE 2

The recipe for preparing the inventive
and comparative compositions

| Example |  | CE1 | CE2 | IE1 |
|---|---|---|---|---|
| PPH-1 | [wt %]* | 78.85 | 74.85 |  |
| Elastomer | [wt %]* | 10 | 10 |  |
| HECO | [wt %]* |  |  | 84.85 |
| PMP | [wt %]* | 5.0 | 5.0 | 5.0 |
| CF | [wt %]* | 6.0 | 10.0 | 10.0 |

*rest to 100 wt.-% are additives in regular levels, including polymeric carrier material, antioxidants, and UV-stabilizer, such as pentaerythrityl-tetrakis(3-(3',5'-di-tert. butyl-4-hydroxyphenyl)-propionate in form of the commercial antioxidant "Irganox 1010" of BASF, Germany, CAS-no. 6683-19-8; and tris(2,4-di-t-butylphenyl) phosphite in form of the commercial antioxidant "Irgafos 168 FF" of BASF, Germany, CAS-no. 31570-04-4.

"PPH-1" is the commercial product HF955MO of Borealis AG, which is a propylene homopolymer having a melt flow rate MFR$_2$ (230° C., 2.16 kg) of 20 g/10 min and a density of 908 kg/m$^3$. The propylene homopolymer HF955MO is α-nucleated with polyvinyl cyclohexane.

"Elastomer" is the commercial product Queo8201 of Borealis AG, which is an ethylene/1-octene copolymer having a melt flow rate MFR2 (190° C., 2.16 kg) of 1.1 g/10 min and a density of 883 kg/m$^3$.

"PMP" is the commercial product SCONA TSPP10213GB of Co. Ltd, Germany, which is a polypropylene functionalized maleic acid anhydride having an MVR (170° C., 1.2 kg) of 40 to 100 cm$^3$/10 min and a maleic acid anhydride content of 2.0 wt.-%.

"CF" is the commercial product RECATEX C90 of SGL Carbon SE, which is a non-woven fabric comprising 90 wt.-% carbon fiber having a density determined according to ISO 10119:2002 of 1.8 g/m$^3$ and a tensile strength determined according to ISO 10618:2004 of 4400.

The properties of the Inventive Example IE1 and the Comparative Examples CE1 and CE 2 are summarized in Table 3.

TABLE 3

The recipe for preparing the inventive
and comparative compositions

| Example |  | CE1 | CE2 | IE1 |
|---|---|---|---|---|
| Tensile Modulus (TM) | [MPa] | 3839 | 5631 | 3555 |
| Tensile Strength (TS) | [MPa] | 52 | 66 | 44 |
| Tensile Elongation at Break (TEB) | [%] | 5.6 | 4.4 | 8.7 |
| Charpy Impact Strength (IS) | [kJ/m$^2$] | 31 | 32 | 47 |
| Melt Flow Rate (MFR$_2$) | [g/10 min] | 14.0 | 12.9 | 10.0 |

*based on the total weight of the composition

The invention claimed is:

1. A polypropylene composition (C) comprising:
   (a) 55 to 92 parts per weight of a heterophasic propylene copolymer (HECO);
   (b) 1.0 to 10 parts per weight of a polar modified polypropylene (PMP);
   (c) 7.0 to 35 parts per weight of carbon fibers (CF);
   based on the total parts by weight of compounds (a), (b) and (c),
   wherein the intrinsic viscosity (IV) of the xylene soluble (XCS) fraction of the heterophasic propylene copolymer (HECO) is in the range of 3.0 to 4.0 dl/g,
   wherein the polypropylene composition (C) has:
   (d) a tensile modulus measured according to ISO 527-2 of at least 2500 MPa;
   (e) a tensile strength measured according to ISO 527-2 of at least 25 MPa; and
   (f) a Charpy Impact Strength measured according to ISO 179-1eU:2000 at 23° C. of at least 35 kJ/m$^2$.

2. The polypropylene composition (C) according to claim 1, wherein the polypropylene composition (C) comprises the heterophasic propylene copolymer (HECO) in an amount of at least 55 wt. %, based on the total weight of the polypropylene composition (C).

3. The polypropylene composition (C) according to claim 1, wherein the heterophasic propylene copolymer (HECO) has:
   (a) a melt flow rate MFR$_2$ (230° C., 2.16 kg) measured according to ISO 1133 of not more than 60 g/10 min; and/or
   (b) a comonomer content of not more than 35 mol %; and/or
   (c) a xylene cold solubles (XCS) fraction of not more than 55 wt. %, based on the total weight of the heterophasic propylene copolymer (HECO); and/or
   (d) an intrinsic viscosity (IV) of the xylene soluble (XCS) fraction of the heterophasic propylene copolymer (HECO) in the range of 3.0 to 3.5 dl/g; and/or
   (e) a comonomer content of the xylene soluble (XCS) fraction of the heterophasic propylene copolymer (HECO) of not more than 65 mol %.

4. The polypropylene composition (C) according to claim 1, wherein the polypropylene composition (C) comprises the polar modified polypropylene (PMP) in an amount of at least 1.0 wt. %, based on the total weight of the polypropylene composition (C).

5. The polypropylene composition (C) according to claim 1, wherein the polar modified polypropylene (PMP) comprises groups derived from polar groups selected from the group consisting of acid anhydrides, carboxylic acids, carboxylic acid derivatives, primary and secondary amines, hydroxyl compounds, oxazoline, epoxides, and ionic compounds.

6. The polypropylene composition (C) according to claim 1, wherein the polar modified polypropylene (PMP) is a propylene polymer grafted with maleic anhydride.

7. The polypropylene composition (C) according to claim 1, wherein the polypropylene composition (C) comprises the carbon fibers (CF) in an amount of at least 7.0 wt. %, based on the total weight of the polypropylene composition (C).

8. The polypropylene composition (C) according to claim 1, wherein the heterophasic propylene copolymer (HECO) and the polar modified polypropylene (PMP) are comprised in an amount of at least 57.5 wt. %, based on the total weight of the polypropylene composition (C).

9. The polypropylene composition (C) according to claim 1, wherein the heterophasic propylene copolymer (HECO), the polar modified polypropylene (PMP) and the carbon fibers (CF) are comprised in an amount of at least 60 wt. %, based on the total weight of the polypropylene composition (C).

10. The polypropylene composition (C) according to claim 1, wherein the heterophasic propylene copolymer (HECO) comprises:
    (a) a polypropylene matrix (M) and
    (b) an elastomeric copolymer (E) comprising units derived from propylene and ethylene and/or C$_4$ to C$_{20}$ alpha-olefins.

11. The polypropylene composition (C) according to claim 1, wherein the polypropylene composition (C) has a tensile elongation at break measured according to ISO 527-2 of at least 6.0%.

12. The polypropylene composition (C) according to claim 1, wherein the polypropylene composition (C) does not comprise:
- (a) any other fibers besides the carbon fibers (CF); and/or
- (b) any other polymers besides the heterophasic propylene copolymer (HECO) and the polar modified polypropylene (PMP).

13. An article comprising the polymer composition (C) according to claim 1.

14. The article according to claim 13, wherein the article is a molded article or an extruded article.

15. The article according to claim 13, wherein the article is an automotive article.

* * * * *